United States Patent [19]

Hankinson

[11] Patent Number: 4,654,188
[45] Date of Patent: Mar. 31, 1987

[54] PIVOTABLY MOUNTED REACTOR SHROUD SHIELD AND SHIELDING METHOD

[75] Inventor: Michael F. Hankinson, Monroeville Boro, Pa.

[73] Assignee: Westinghouse Electric Corp., Pittsburgh, Pa.

[21] Appl. No.: 690,719

[22] Filed: Jan. 11, 1985

[51] Int. Cl.⁴ .............................................. G21C 19/00
[52] U.S. Cl. ..................................... 376/260; 376/287; 250/515.1
[58] Field of Search ............................ 376/287, 260; 250/515.1, 517.1, 518.1, 519.1

[56] References Cited

U.S. PATENT DOCUMENTS

| | | | |
|---|---|---|---|
| 3,286,094 | 11/1966 | Pretto | 250/519 |
| 3,680,498 | 8/1972 | Roos | 250/517 |
| 3,766,006 | 10/1973 | Frisch et al. | 376/228 |
| 3,785,925 | 1/1974 | Jones | 376/272 |
| 3,995,165 | 11/1976 | Buth et al. | 250/517 |
| 4,123,662 | 10/1978 | Fisher | 250/518 |
| 4,200,172 | 4/1980 | Meuschke et al. | 250/517 |
| 4,254,341 | 3/1981 | Herr et al. | 250/519 |
| 4,360,736 | 11/1982 | Weissenfluh | 250/517 |
| 4,432,932 | 2/1984 | Jacobson | 376/287 |
| 4,530,813 | 7/1985 | Jacobson | 250/515 |

FOREIGN PATENT DOCUMENTS

| | | | |
|---|---|---|---|
| 1162334 | 2/1984 | Canada | 376/287 |
| 1466848 | 2/1969 | Fed. Rep. of Germany | 250/519 |
| 3326880 | 2/1985 | Fed. Rep. of Germany | 250/515 |
| 1396127 | 3/1965 | France | 250/517 |
| 1441764 | 5/1966 | France | 250/517 |
| 2018443 | 5/1970 | France | 250/517 |

Primary Examiner—Deborah L. Kyle
Assistant Examiner—Dan Wasil
Attorney, Agent, or Firm—Daniel C. Abeles

[57] ABSTRACT

Shielding for technicians working around a nuclear reactor during the refueling process is provided by permanently mounting a shield support around the reactor shroud and temporarily hanging shielding members such as lead panels from the support. The shield support includes a permanent rail encircling the shroud and swingout arms which are pivotably mounted to the permanent rail. During use the shielding members are positioned adjacent the swingout arms by a stud tensioner hoist, and the swingout arms are pivoted outward to receive the shielding members. When installed, the edges of the shielding members overlap.

20 Claims, 9 Drawing Figures

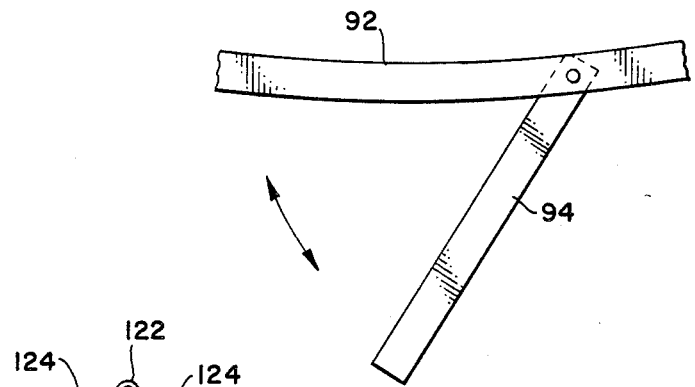
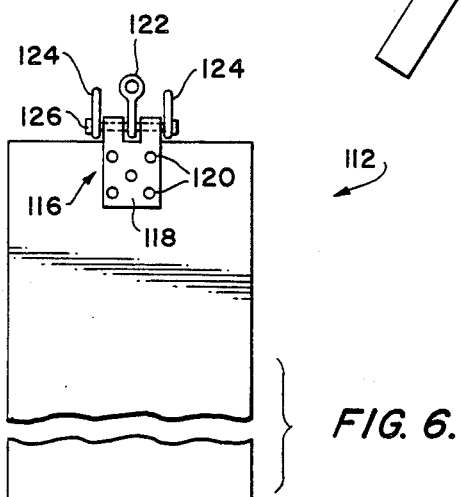
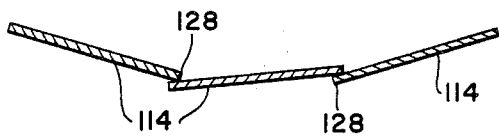

PIVOTABLY MOUNTED REACTOR SHROUD SHIELD AND SHIELDING METHOD

BACKGROUND OF THE INVENTION

The present invention is directed to a reactor shroud shield and method for using it, and more particularly to a gamma-ray attenuating shield which can be installed to protect technicians working in the region of a reactor head.

A nuclear reactor typically includes a reactor vessel which is disposed in a concrete well located in the floor of a reactor room. A reactor head is bolted to the reactor vessel, which contains water and nuclear fuel housed in an array of fuel assemblies. During operation the nuclear fuel heats the water, which is circulated by pipes from the reactor vessel to steam generators and then back to the reactor vessel for reheating. In order to regulate the degree of water heating and control the nuclear reaction, control rods of neutron absorbing material are movably mounted within the reactor vessel. Control rod drive mechanisms mounted on the reactor head are used to adjust the control rods, with the control rod drive mechanisms and various control and sensor devices being housed within a shroud extending upward from the reactor head. It will be understood that the term "shroud" refers to the housing for the control rod drive mechanisms, although this housing may occasionally be known by other terms, such as lifting skirt. Control rod drive mechanisms are disclosed, for example, in U.S. Pat. No. 3,766,006.

During refueling, the nuclear reaction within the vessel is quenched and technicians wearing protective clothing unbolt the reactor head by removing nuts from studs so that the head can be removed from the reactor vessel. These nuts are large and heavy, and a stud tensioner hoist mounted on a circumferential track is available to assist the technicians in handling the nuts and tools. After the reactor head has been bolted, the reactor room is flooded with water to provide shielding and the reactor head, control rod drive mechanisms, shroud, etc., are hoisted by lifting rods attached to the head to expose the depleted fuel assemblies. The depleted fuel assemblies are removed, under water, to a pool of borated water for short-term storage. The reactor is then refueled and the head assembly, complete with control rod drive mechanisms, etc., is set in place on top the reactor vessel. After the water is drained from the reactor room technicians wearing protective clothing re-enter the reactor room to securely bolt the reactor head to the reactor vessel so that operation can continue.

The reactor head itself is a hemispherical body typically made of steel, perhaps 18 cm thick, and substantially attenuates gamma-rays from inside the reactor vessel. However the control rod drive mechanisms, during the course of time, tend to accumulate a residue of fission products. Since the control rod drive mechanisms are shielded by the shroud alone, and not by the reactor head, the technicians in the reactor room during the refueling operation are exposed to radiation from the control rod drive mechanisms. While this exposure is a modest one, the steadily increasing safety standards in the nuclear industry have made it desirable to provide additional shielding to the technicians during the refueling operation.

U.S. Pat. No. 4,432,932 provides additional shielding by suspending quilted blankets of lead wool from short mounting arms fixedly attached to the shroud. The technicians install the blankets before undertaking the longer task of bolting or unbolting the reactor head. However, such blankets are unwieldy, and in practice may weigh substantially more than the technicians who install them. Even if the stud tensioner hoist is used to manipulate the blankets as they are being hung or removed, the blankets must still be muscled laterally by the distance between the stud tensioner hoist and the mounting arms on the shroud. This not only increases fatigue, it slows the blanket installation process and consequently increases the exposure to radiation. Moreover the heavy weight and awkward movements that are necessary increase the possibility of slips or other accidents.

SUMMARY OF THE INVENTION

The primary object of the present invention is to provide a reactor shroud shield which permits shielding members to be installed around the reactor shroud or removed therefrom more expeditiously than in the prior art.

Another object of the present invention is to provide a reactor shroud shield having pivotable mounting arms which can swing toward the stud tensioner hoist to facilitate transfer of the shielding members.

Another object of the present invention is to provide a reactor shroud shield employing shielding members in the form of overlapping panels which encircle the shroud.

These and other objects can be attained by attaching a permanent rail to the shroud or to lifting rods extending upward from the reactor head. The permanent rail encircles the shroud. A plurality of swingout rails are pivotably mounted to the permanent rail, so that they can be swung toward the stud tensioner hoist. One or more hangers are attached to each swingout rail to receive shielding members, which may be in the form of lead panels having suspension members pivotably attached thereto. Each suspension member has an eye element for engagement by the stud tensioner hoist and hook elements for engagement by the hangers attached to the swingout arms. When fully installed, the lead panels encircle the lower portion of the shroud and overlap each other so as to avoid unshielded "seams" between the panels.

BRIEF DESCRIPTION OF THE DRAWINGS

FIG. 5 is a top plan view of a portion of the permanent rail and a swingout rail in its extended position;

FIG. 6 is a front elevational view of a shielding panel;

FIG. 7 is a sectional view illustrating three shielding panels and the overlapping thereof when the panels are installed;

DESCRIPTION OF THE PREFERRED EMBODIMENTS

Figure 1:
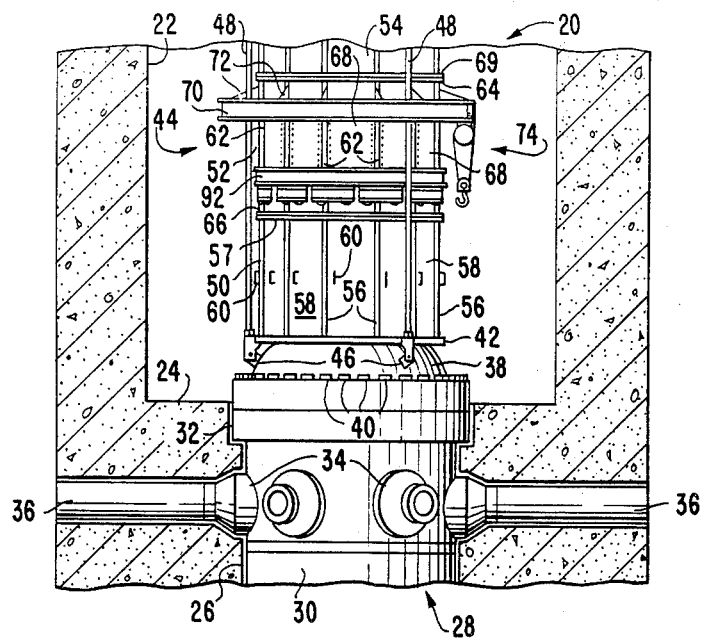
FIG. 1 is a front elevational view, partially in section, generally illustrating portions of a reactor vessel, reactor head, and shroud, with the permanent rail and swingout arms attached thereto.

In FIG. 1, reactor room 20 has concrete walls 22 and floor 24. A reactor well 26 extends downward from floor 24. Nuclear reactor 28 is housed in room 20 and well 26.

Reactor 28 includes a generally cylindrical reactor vessel 30 having a mouth portion 32. Nozzles 34 extend from vessel 30 to receive pipes 36, which convey heated water to steam generators (not illustrated) and other apparatus and thence back to reactor 28.

During operation, reactor head 38 is attached to mouth region 32 by studs (not illustrated) around the periphery of mouth region 32 and bolts 40 screwed to the studs. A shroud support ring 42 is affixed to head 38 to support shroud 44. Three lugs 46 (only two of which are illustrated) are affixed to head 38 to receive lift rods 48. During refueling, lift rods 48 are used to hoist head 38 and shroud 44. Control rod drive mechanisms and other control devices which are not illustrated are housed within shroud 44.

There are currently several shroud designs in use with nuclear reactors. Shroud 44 may be deemed an "integrated head" shroud, which provides various advantages over older shrouds The present invention is not, however, limited to use with integrated head shrouds. Regardless of the particular design, however, the shroud serves to cool the control rod drive mechanisms therein by circulating air to them.

With continuing reference to FIG. 1, shroud 44 includes a lower portion 50, a middle portion 52, and an upper portion 54. Portions 50–54 are generally barrel-shaped in configuration, and are joined one on top of the other to from shroud 44. Lower portion 50 includes a ring of vertically positioned metal beams 56 which extend between ring 42 and flange 57. Metal doors 58 are positioned between the beams 56. One side of each door 58 is mounted by hinges (not illustrated) to a beam 56, and the other side has a handle 60 attached thereto to permit technicians wearing protective clothing to briefly enter shroud 44 in order to service the control rod drive mechanisms, etc.

Middle portion 52 is constructed much as lower portion 50. A ring of vertically disposed metal beams 62 extends between flange 64 and flange 66, which is affixed to flange 57 by a ring of bolts (not illustrated). However doors are unnecessary between beams 62, so metal panels 68 are permanently affixed between beams 62. Flange 69 of upper portion 54 is affixed to flange 64 of middle portion 52 by bolts (not illustrated).

With continuing reference to FIG. 1, an integrated head cooling shroud, such as shroud 44, typically has a stud tensioner hoist rail 70 attached thereto by mounting brackets 72, one of which is welded to each beam 62 of middle section 52. Rail 70 can be provided by an I-beam which is bent into a circle. Brackets 72 extend radially outward to support beam 70 above the bolts 40. Rail 70 provides a track for stud tensioner hoist 74, so that hoist 74 can be moved to a position for use with each bolt 40. Hoist 74 will be described in more detail with reference to FIG. 2.

Stud tensioner hoist 74 includes a housing 76 which encloses such elements (not illustrated) as a motor, reduction gearing, and a pulley. Legs 78 extend upward from housing 76. Wheels 80 are journalled for rotation on legs 78 in order to permit hoist 74 to be rolled along the bottom flange of rail 70. A hook 82 is affixed to bracket 84, which rotatably supports pulley 86. Cable 88 loops around pulley 86 to permit hook 82 to be raised or lowered.

As is set forth in the Background portion of this application, it is desirable to provide additional shielding around the shroud, shroud 44 being only one example. The additional shielding should be disposed relatively close to the shroud in order to permit access to bolts 40. To this end, the present application provides a shielding system which can be applied to reactors which are already in use. In such a case, technicians permanently mount a shield support around the existing shroud, and thereafter shielding can be hung on the support when necessary. The workers do not, of course, have the advantage of additional shielding when they are installing the shield support, but this is a one-time task which can be accomplished relatively briefly. Typically the radiation exposure when the shield support is mounted is substantially less than the radiation previously received during every refueling. The shield support can also be installed when a new reactor is built, so that it need not be retrofit later.

Figure 3:
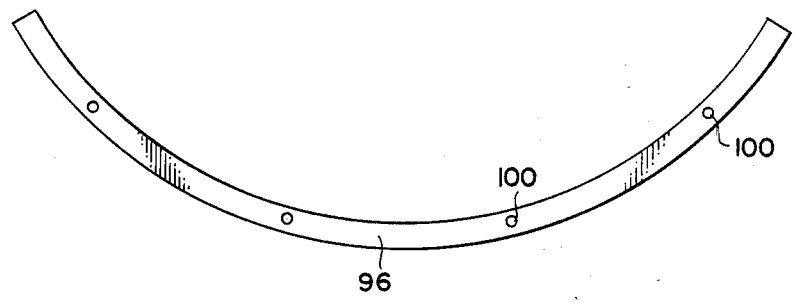
FIG. 3 is a top plan view of a permanent rail section.
Figure 2:
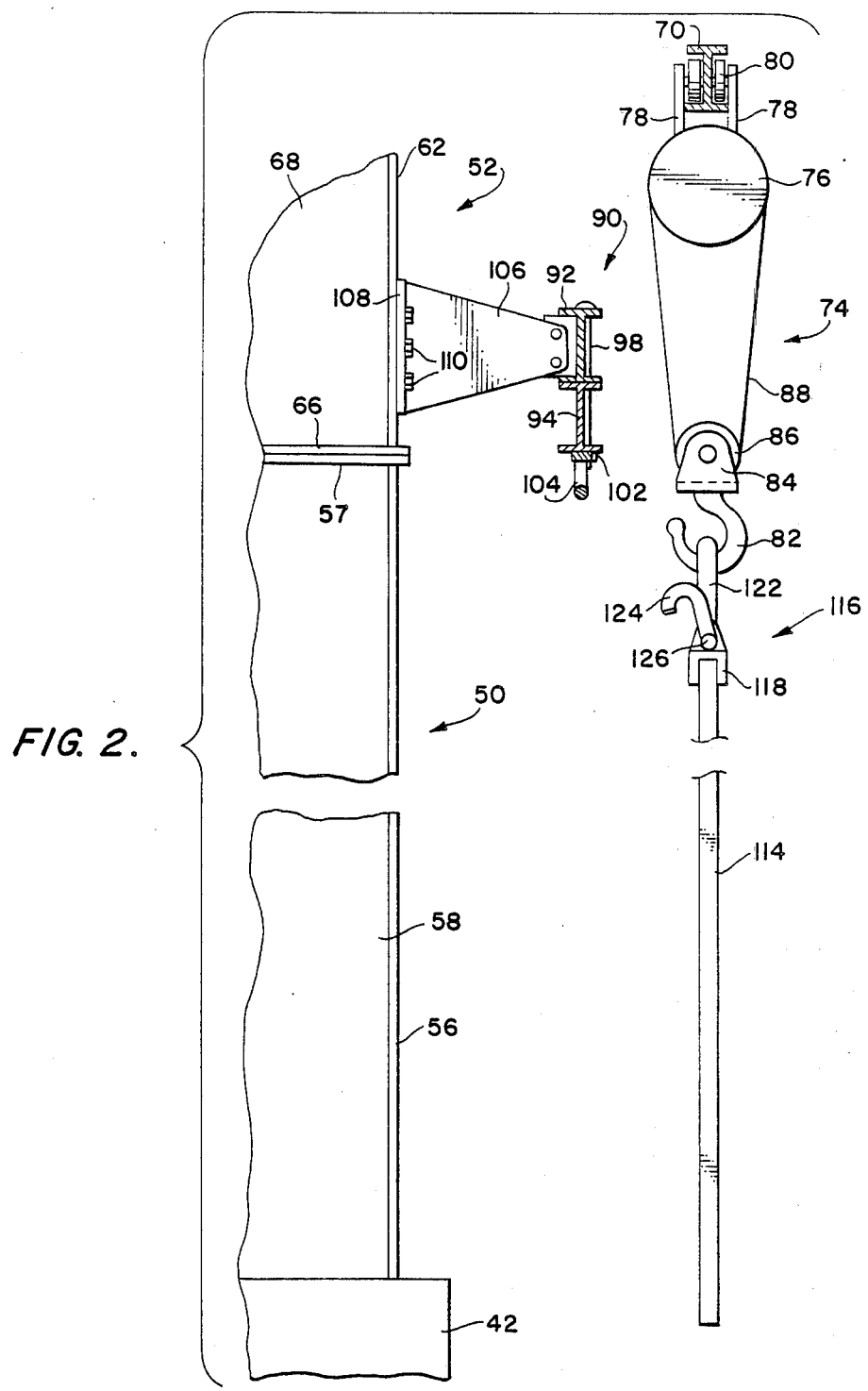
FIG. 2 is a front elevational view, partially in section, generally illustrating the permanent rail and swingout rail, and a shielding panel which is being lifted upward by the tensioner hoist.

With reference to FIG. 2, shield support 90 includes a permanent rail 92 with swingout rails 94 pivotably attached thereto. Rail 92 encircles shroud 44, although it may be provided by three 120° sections 96 as illustrated in FIG. 3 in order to facilitate installation when the invention is adapted as a retrofit to reactors already in use. Section 96 are preferably constructed of bent I-beams. Swingout sections 94 are also preferably made of I-beams.

Returning to FIG. 2, the pivotable connection between permanent rail 92 and swingout rails 94 may be provided by bolts 98, which extend through bores (for example, see bores 100 in FIG. 3) in the I-beams. Nuts 102 are threaded to bolts 98. The pivotable connection permits the rails 94 to be swung outward from rail 92 and then back inward, as illustrated in FIG. 5.

Figure 4:
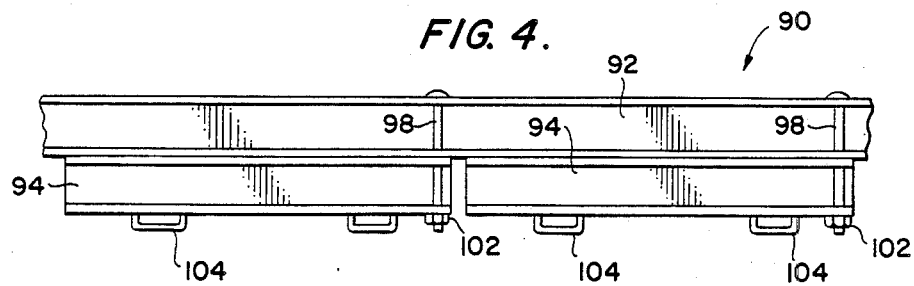
FIG. 4 is a front elevational view illustrating portions of the permanent rail and swingout rails mounted thereto.

Turning next to FIG. 4, hangers 104 are attached to swingout arms 94, which, in turn, are pivotably mounted to permanent rail 92 as previously described, before shield support 90 is installed if the reactor is already in use. Such pre-assembly allows the elements to be installed as a unit, thereby minimizing exposure.

Returning to FIG. 2, shield support 90 is affixed to middle portion 52 of shroud 44. Mounting brackets 106 are affixed to permanent rail 92 and are positioned to abut beams 62, one bracket 106 for each beam 62. Brackets 106 have flanges 108 having bores (not illustrated) through them. During installation the technicians hold support 90 so that a flange 108 lies against a beam 62, and holes are then drilled through the beam 62. Bolts 110 are then inserted to secure support 90. This mounting procedure is repeated for the remaining brackets 106.

Turning next to FIG. 6, each shielding member 112 preferably includes a panel 114 of lead approximately 2 cm thick, which provides a fifty percent reduction in gamma radiation. For a typical nuclear reactor, and assuming that there are two panels 114 for every swingout arm 94, panels 114 may be about 2.8 meters high and about 0.8 meters wide. Each such panel would have a mass of approximately 160 Kg.

With reference to FIGS. 2 and 6, each panel 114 has a suspension member 116 centered at the top thereof. Member 116 includes a mounting bracket 118 which is affixed to panel 114 by bolts 120. An eye element 122 and a pair of hook elements 124 are affixed to pin 126, which is rotatably mounted by bracket 118.

The installation of shielding panels 114 will now be described. It will be assumed in the following discussion that support 90 has already been mounted.

Referring to FIG. 1, panels 114 are first lowered by a crane (not illustrated) to floor 24 of reactor room 20. The hook 82 (see FIG. 2) of stud tensioner hoist 74 is then lowered to floor 24 and inserted through the eye 122 (see FIG. 2) of a panel 114. Hoist 74 then lifts the panel 114 above floor 24. Referring next to FIG. 2, it will be noted that hook elements 124 jut toward hangers 104 when panel 114 is supported by hook 82. Panel 114 is lifted, and stud tensioner hoist 74 is pushed along rail 70, until the hooks 114 are aligned with a hanger 104. Thereafter the swingout rail 94 is pivoted outward, as illustrated in FIG. 5, to receive the panel 114.

FIG. 4 illustrates two hangers 104 for every swingout arm 94, in which case two panels 114 are mounted on each swingout arm. Alternately, a single hanger 104 could be used with every swingout arm 94 in order to suspend a single panel 114, or more than two hangers 104 could be used to suspend a corresponding number of panels 114. The widths of the panels 114, of course, would differ depending upon how many are used.

After a swingout arm 94 has received its entire complement of panels 114, the arm 94 is pivoted back inward toward shroud 44. Using the suspended panels 114 to shield himself during further installation, the technician then proceeds to hang panels 114 on the next swingout arm 94. The technician thus progresses around shroud 44, and receives shielding as he works from the panels 114 which have already been hung. Removal of panels 114 is accomplished in a manner substantially the reverse of the installation procedure described above.

Turning next to FIG. 7, the edges of panels 114 overlap, as at overlap regions 128, in order to avoid "seams" through which radiation could escape. It will be apparent that such overlaps can be provided regardless of whether one, two, or more panels 114 are suspended from each swingout arm 94.

Although panels 114 are preferred since they can be readily handled, guilted blankets of lead wool might alternately be employed as shielding members 112. Moreover, radiation attenuating materials other than lead can be used.

Figure 8:
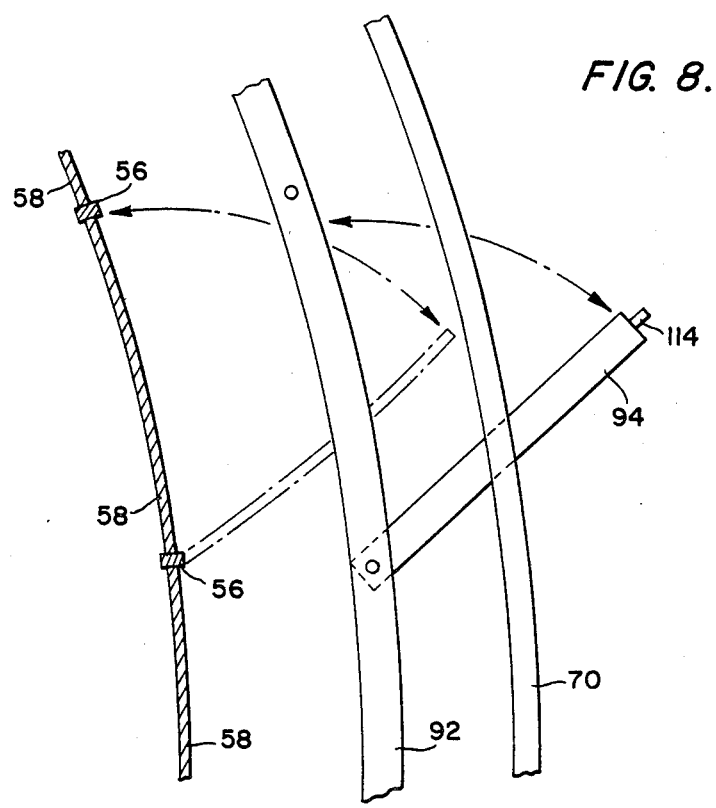
FIG. 8 is a top plan view, partially in section, generally illustrating portions of the shroud, the permanent rail, and the rail supporting the stud tensioner hoist.

FIG. 8 generally illustrates that permanent rail 92 is mounted between the shroud and stud tensioner hoist rail 70. FIG. 8 also illustrates that swingout arms 94 can be positioned to allow access to the interior of shroud 44 through doors 58 therein even when the shielding is in place. A technician within the shroud would not, of course, receive the benefit of the shielding.

Figure 9:
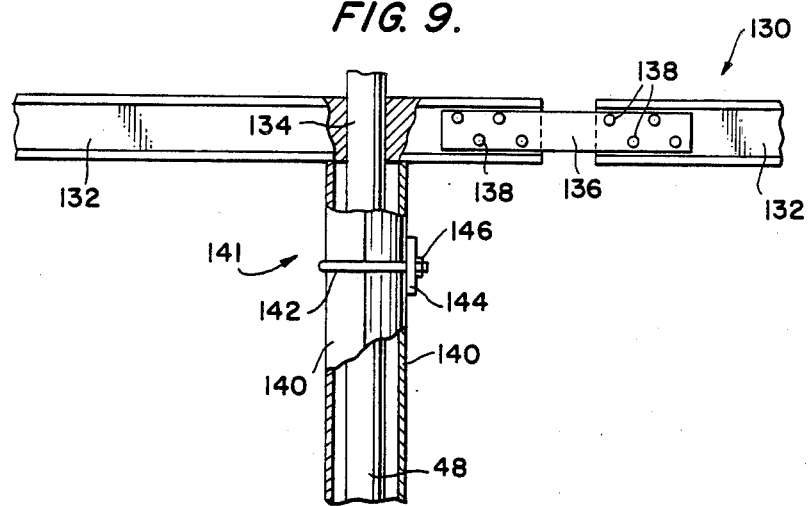
FIG. 9 is a front elevational view, partially in section, generally illustrating an alternate way to support the permanent rail.

FIG. 9 illustrates an alternate way to mount the permanent rail of the shield support. This alternative mounting technique may be used with integrated head shrouds, such as shroud 44, but it is particularly useful for certain previous shroud designs wherein the shroud itself cannot be used to mount the permanent rail. In FIG. 9, which does not illustrate the swingout rails, permanent rail 130 is provided by rail segments 132. Three segments 132 are used, each being curved through a circular arc of substantially 120°. Near one end of each segment 132 is a bore 134. The adjacent ends of segments 132 are joined by plates 136 and bolts 138. Thus assembled, rail 130 is positioned above the reactor so that bores 134 are aligned with the lift rods 48 (see FIG. 1). Rail 130 is then lowered down rods 48.

Rail 130 is not lowered all the way to reactor head 38. Instead, a pair of sleeves 140 are positioned around the lower portion of each rod 48 and held together by a number of clamps 141. Each clamp 141 may include a U-shaped element 142, a bar 144, a nuts 146.

Another alternative for mounting the shield support would be to suspend the permanent rail from the seismic support platform. Although not illustrated in the drawings, seismic support platforms are used with nuclear reactors to provide lateral support for the control rod drive mechanisms in the event of seismic disturbances.

From the foregoing description it will be apparent that the present invention provides a shielding method and system for protecting technicians during refueling of a nuclear reactor. Shielding panels are hung in an overlapping manner from a shield support, which can be mounted on the shroud or elsewhere. The shield support includes swingout arms which facilitate transfer of the panels from the stud tensioner hoist to their installed positions. It will be understood that the above description of the present invention is susceptible to various modifications, changes, and adaptations, and the same are intended to be comprehended within the meaning and range of equivalents of the appended claims.

What I claim is:

1. A method for shielding persons working around a nuclear reactor having a reactor head and a shroud extending upward from the reactor head, comprising:
   (a) mounting a plurality of swingout arms around the shroud, each swingout arm being pivotable about a respective axis that is substantially vertical and that is fixed with respect to the shroud;
   (b) positioning a shielding member adjacent a swingout arm with a hoist;
   (c) pivoting the swingout arm horizontally away from the shroud and toward the hoist;
   (d) transferring the shielding member from the hoist to the swingout arm so that the swingout arm supports the shielding member;
   (e) pivoting the swingout arm horizontally back toward the shroud; and
   (f) repeating steps (b) through (c) until the shroud is substantially surrounded by shielding members.

2. The method of claim 1, wherein step (f) is conducted by surrounding the shroud with shielding members having edges which overlap.

3. The method of claim 1, wherein step (f) is conducted by surrounding the shroud with shielding members in the form of lead panels with edges which overlap.

4. The method of claim 3, wherein said hoist is a stud tensioner hoist having a hook, wherein each swingout arm has at least one hanger attached thereto, wherein step (b) comprises lifting the panel with the stud tensioner hoist hook via a suspension member attached to the panel, said suspension member including a first element and a second element which are affixed to one another and which are rotatable with respect to said panel, the stud tensioner hoist hook engaging the first element as step (b) is conducted, and wherein step (d)

comprises hanging the panel substantially vertically from the first element while the second element projects toward the hanger, inserting the second element in the hanger, removing the stud tensioning hoist hook from the first element, and supporting the panel substantially vertically from the second element.

5. The method of claim 1, wherein step (a) comprises mounting a shield support around the shroud, said shield support including a permanent rail encircling the shroud, said swingout arm being pivotably attached to said permanent rail.

6. The method of claim 5, wherein the shroud includes a ring of vertically disposed beams, and wherein the step of mounting a shield support comprises dividing the permanent rail into a plurality of sections, affixing brackets to the sections, and affixing the brackets to the beams.

7. A method according to claim 6, wherein the brackets have flanges with bores therein, and wherein the step of affixing the brackets to the beams comprises aligning the brackets with the beams, drilling the beams through the bores, and bolting the flanges to the beams.

8. A method according to claim 6, wherein the shroud has doors, and wherein the step of mounting a shield support is conducted by positioning the shield support so that the swingout arms allow access to the doors when the shielding members are hung.

9. A method of claim 5, wherein the reactor has vertically disposed lifting rods affixed thereto, and wherein the step of mounting a shield support comprises drilling bores through the permanent rail at positions corresponding to the lifting rods, threading the lifting rods through the bores, and lowering the shield support.

10. The method of claim 9, wherein the step of mounting a shield support further comprises affixing sleeves around the lower portions of the rods, said sleeves having ends, and lowering the shield support until the permanent rail is supported at the ends of the sleeves.

11. The method of claim 10, wherein the step of affixing sleeves comprises positioning a first elongated sleeve having a C-shaped cross section adjacent each lifting rod, positioning a second elongated sleeve having a C-shaped cross section adjacent the first sleeve and opposite thereto, in clamping the first and second sleeves together.

12. The method of claim 11, wherein the step of clamping the sleeves together comprises placing a U-shaped element around both sleeves, and bolting a retaining member to the U-shaped element so that the U-shaped element and the retaining member together encircle the sleeves.

13. A method for installing shielding members around a reactor shroud, said shielding members having edges, comprising:
(a) mounting around the shroud a plurality of means for supporting said shielding members, each means for supporting being pivotable about a respective axis that is substantially vertical and that is fixed with respect to the shroud;
(b) positioning a shielding member adjacent a means for supporting;
(c) mounting the shielding member on the means for supporting so that the shielding member has a first edge positioned further from the shroud than a second edge thereof;
(d) rotating the shielding member horizontally toward the shroud by moving the first edge toward the shroud; and
(e) repeating steps (b) through (c) until the shroud is substantially surrounded by shielding members.

14. The method of claim 13, wherein step (e) is conducted by surrounding the shroud with shielding members so that their edges overlap, the second edge of each panel being positioned between the shroud and an overlapping first edge of an adjacent shielding member.

15. The method of claim 14, wherein step (a) is conducted by mounting a shield support around the shroud, said shield support including a permanent rail encircling the shroud and a plurality of swingout arms pivotably attached to the permanent rail, wherein step (b) is conducted with a hoist, wherein step (c) comprises pivoting the swingout arm away from the shroud and toward the hoist and transferring the shielding member from the hoist to the swingout arm, and wherein step (d) is conducted by pivoting the swingout arm back toward the shroud.

16. In a nuclear reactor system having a reactor head and a shroud extending upward from the reactor head, an apparatus for shielding persons working around the reactor head, said apparatus comprising:
a plurality of swingout arms each having a first end and a second end;
means disposed around the shroud for mounting said swingout arms at the first ends thereof, each swingout arm being pivotable about a respective axis that is substantially vertical and that is fixed with respect to the shroud, the second ends of said swingout arms being horizontally movable between first positions that are spaced apart from the shroud and second positions adjacent the shroud;
a plurality of shielding members; and
means for hanging at least one shielding member to each swingout arm.

17. The apparatus of claim 16, wherein said shielding members are panels, and wherein said means for hanging comprises at least one hanger affixed to each swingout arm and a suspension member affixed to each panel, each said suspension member including a mounting bracket affixed to the panel and a member having first and second extending portions that are disposed at an angle with respect to each other, said member being rotatably mounted on said mounting bracket.

18. The apparatus of claim 17, wherein said means disposed around the shroud comprises a generally hoop-shaped permanent rail, brackets affixing the permanent rail to the shroud, and means for pivotably mounting the first ends of the swingout arms to the permanent rail.

19. The apparatus of claim 17, wherein said reactor head has a plurality of lifting rods attached thereto, said lifting rods being substantially parallel to one another, and wherein said means disposed around the shroud comprises a generally hoop-shaped permanent rail having bores therein, said lifting rods being threaded through said bores, and means for pivotably mounting the first ends of the swingout arms to the permanent rail.

20. The apparatus of claim 19, further comprising sleeves disposed around each lifting rod and between the reactor head and said permanent rail, and means for clamping the sleeves together.

* * * * *